No. 791,928. PATENTED JUNE 6, 1905.
M. MOORE & T. J. HESKETT.
PROCESS OF TREATING FERRUGINOUS ORE FOR THE MANUFACTURE OF IRON AND STEEL THEREFROM.
APPLICATION FILED JAN. 25, 1904.
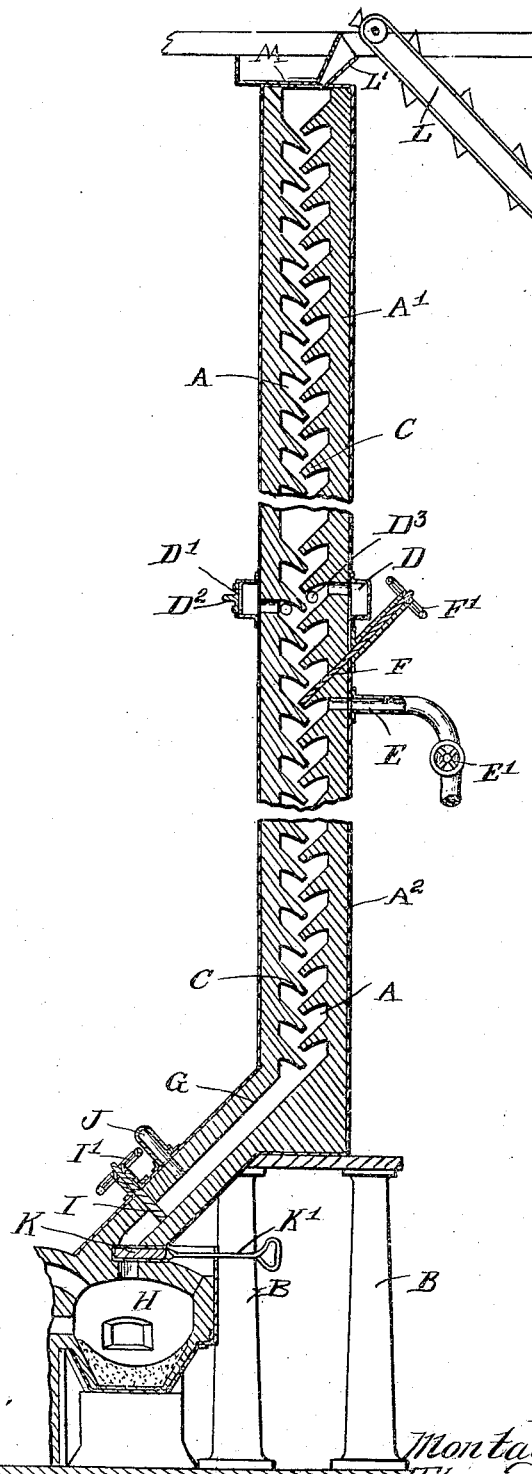
Witnesses:
Inventors
Montague Moore
Thomas J. Heskett
By James L. Norris
Attys.

No. 791,928.                                                    Patented June 6, 1905.

UNITED STATES PATENT OFFICE.

MONTAGUE MOORE, OF MELBOURNE, AND THOMAS JAMES HESKETT, OF BRUNSWICK, VICTORIA, AUSTRALIA.

PROCESS OF TREATING FERRUGINOUS ORE FOR THE MANUFACTURE OF IRON AND STEEL THEREFROM.

SPECIFICATION forming part of Letters Patent No. 791,928, dated June 6, 1905.

Application filed January 25, 1904. Serial No. 190,588.

*To all whom it may concern:*

Be it known that we, MONTAGUE MOORE, a resident of No. 408 Collins street, Melbourne, and THOMAS JAMES HESKETT, a resident of No. 86 Donald street, Brunswick, in the State of Victoria and Commonwealth of Australia, subjects of the King of Great Britain, have invented a new and useful Improved Process of Treating Ferruginous Ore for the Manufacture of Iron and Steel Therefrom, of which the following is a specification.

Our improved process has been devised mainly for the purpose of manufacturing iron and steel from what are known as "magnetic-iron sands," such as those found in New Zealand and elsewhere; but it is equally applicable for treating any ferruginous ore which has been crushed or ground to a state of comminution.

Our process consists in first concentrating and separating from such ferruginous ore any silica, earthy, or other deleterious matter contained therein. The ore is then subjected while passing through a chamber to the action of heat, preferably produced by the admixture of air with waste carbonic oxid or hydrocarbon gas issuing from another chamber, and subsequently to the progressive reducing action of such gas or gases alone while passing through said latter chamber, the result being that all the oxygen is removed from the ore, which is thereby converted into the metallic state, but being still in a finely-divided condition. It is then allowed to pass without coming into contact with an oxidizing atmosphere into a Siemens or other gas-furnace and immersed in a bath of molten metal or slag which is always maintained therein and in said furnace is fused and "balled up" as wrought-iron or converted into molten steel. During the time the charge is being delivered to the gas-furnace the supply of atmospheric air to the gas-furnace is cut off. The keeping of the heated reduced ore from contact with an oxidizing atmosphere during the operation of delivering it from the deoxidizer to the gas-furnace is an essential feature of our process.

In cases where hydrocarbon gases are used as the deoxidizing agent more heat would be generated when such gas is mixed with air than would be required, and for the sake of economy we take a portion of this surplus gas after it passes through the deoxidizing-chamber and feed it to the Siemens or other gas-furnace for heating it.

In lieu of using the waste carbonic oxid or hydrocarbon gas mixed with air for the purpose of heating the ore prior to deoxidization by such gas alone it is obvious that the heating of the ore may be effected by other means; but so far as we are aware our process is the most economical.

We are aware that attempts have been made to manufacture iron from ferruginous ore in a fine state of division by subjecting it to the deoxidizing action of carbonic oxid or other gases and subsequently bringing it to a state of fusion in a Siemens or other gas-furnace; but so far as we know such ore has not previously been subjected to a preliminary heating and certainly not to a preliminary heating by the complete combustion of waste gases from the reducing or deoxidizing chamber with air before being deoxidized by such gases, nor has it been kept from contact with an oxidizing atmosphere during the delivery of the reduced ore from the deoxidizer and its subsequent treatment in the furnace.

In the annexed drawing we have illustrated a sectional elevation of an apparatus which we have devised for carrying out our process and which apparatus is embodied in an application for Letters Patent filed contemporaneously herewith.

Referring now to the drawing, A is a vertical square brick tower incased with iron and supported on four piers B, said tower containing a number of shelves C on either side thereof and arranged in series one above the other and approximately at an angle of forty-five degrees below the horizontal, those on one side alternating with those on the other.

D is a hollow casing around the tower A at about a point midway of its height. $D'$ is a slot in one side of said hollow casing, and $D^2$ is a sliding door to regulate the supply of air passing through said slot to the casing, if and when required.

$D^3$ represents inlets in the tower A to permit of the air passing from the casing D to the interior of the upper portion A' (hereinafter called the "heating-chamber") of the tower A.

E is a pipe for the purpose of withdrawing from the top of the lower portion A² (hereinafter called the "deoxidizing-chamber") of the tower A surplus gas when hydrocarbon gas is used as the deoxidizing agent and conducting it to the gas-furnace H. E' is a cock in said pipe E.

F is a valve, and F' is a wheel by which said valve can be operated to regulate the passage of gas from and ore through the lower or deoxidizing chamber A².

G is an inclined passage from the base of the tower A to the top of a Siemens or other gas-furnace H.

I is a valve for the purpose of stopping the flow of reduced ore through the passage G until a sufficient quantity has collected to form a charge. I' is a wheel to operate said valve I.

J is a pipe for supplying gas from the producers. (Not shown.)

K is a fire-brick valve for closing the opening to the gas-furnace H. K' is a handle for operating said valve K.

L is an elevator which delivers the ore to be treated into a chute L' at the top of the tower.

M is a sliding door at the top of the tower to regulate the draft and to prevent ingress of air in any large quantity to the tower. This door can be operated in any approved way.

In carrying out the process the mode of operation is as follows: The Siemens gas-furnace is first heated in the ordinary way, the valves I and K being closed. At the same time a reducing-gas, such as carbonic-oxid or hydrocarbon gas, is admitted through pipe J to the passage G, leading to the base of the tower A. The gas passes up the tower, and when it comes in contact with the air, which enters through slot D' and holes D³, combustion ensues and the upper portion A' of the tower becomes a heating-chamber. The concentrated and separated ore is fed to the top of the tower A by the elevator L and falls upon the topmost shelf C, and so on from shelf to shelf, every particle being thereby exposed to the heat. By the time the ore reaches the air-inlets D³ it has become red-hot. In its further passage down the tower the ore passes through the body of gas in the deoxidizing-chamber A², and by the time it reaches the passage G it is completely deoxidized and reduced to fine particles of metallic iron. As soon as a charge has collected in the passage G valves I and K are opened, and the reduced ore passes into the gas-furnace H, where it is fused and balled up as wrought-iron or converted into steel in the usual manner.

What we claim as our invention, and desire to secure by Letters Patent, is—

1. A process of treating ferruginous ore for the manufacture of iron and steel consisting in suitably concentrating and separating the material, then subjecting the concentrated and separated material in a finely-divided state while passing in a continuous stream to such a temperature as to bring the material to a red heat, then subjecting the heated material in a finely-divided state while passing in a continuous stream to a suitable gas so as to convert the material into metallic particles without coming into contact with an oxidizing atmosphere, and then fusing and balling up the metallic particles without coming into contact with an oxidizing atmosphere.

2. A process of treating ferruginous ore in a fine state of division for the manufacture of iron and steel consisting in subjecting the ore while passing in a continuous stream to such a temperature as will bring the ore to a red heat, then subjecting the heated material in a finely-divided state to the action of a hydrocarbon gas while said heated material is passing in a continuous stream without coming into contact with an oxidizing atmosphere, thereby converting the material into metallic particles, and then suitably reducing the material to a molten condition without coming in contact with an oxidizing atmosphere.

3. A process of treating ferruginous ore in a fine state of division for the manufacture of iron and steel therefrom which consists in passing the material in a continuous stream, subjecting the material in a finely-divided state during its passage to a temperature produced by the combustion of gas and air to bring the material to a red heat, then subjecting the heated material in a finely-divided state to reducing-gas alone, thereby converting said material into metallic particles, and then suitably reducing the material to a molten condition without coming in contact with an oxidizing atmosphere.

4. A process of treating ferruginous ore in a fine state of division for the manufacture of iron and steel therefrom consisting in suitably concentrating and separating the material, then subjecting the material while passing in a continuous stream in a heating zone to a temperature produced by the combustion of hydrocarbon gas and air, thereby bringing the material to a red heat, then subjecting the material in a reducing zone separate and distinct from said heating zone to the action of hydrocarbon gas alone, thereby converting the material into fine metallic particles, and then fusing the material in a melting zone separate and distinct from said reducing and heating zone.

5. A process of treating ferruginous ore for the manufacture of iron and steel therefrom, consisting of subjecting the material in a heating zone to a temperature sufficient to bring the material to a red heat, then passing the heated material through a deoxidizing zone separate and distinct from said heating zone and subjecting the material while in deoxidizing zone to a deoxidizing-gas, thereby converting the material into fine metallic particles, and then withdrawing the material and said deoxidizing-gas from said deoxidizing-chamber and subjecting the material to the heat from said gas in a melting zone separate and distinct from said deoxidizing zone, thereby bringing the material to a molten condition.

6. A process of treating ferruginous ore in a fine state of division for the manufacture of iron and steel therefrom, comprising the passing of the material in a fine state of division through a heating zone and subjecting the material in said zone to such temperature as to bring the material to a red heat without fluxing or fusing it, then passing the heated material in a fine state of division through a deoxidizing zone separate and distinct from said heating zone and subjecting the material in said deoxidizing zone to a deoxidizing-gas so as to convert the material into fine metallic particles, and then passing the metallic particles into a melting zone separate and distinct from said deoxidizing zone and subjecting the particles in said melting zone to such a temperature so as to melt the same without coming into contact with the atmosphere.

In testimony whereof we have hereunto set our hands in the presence of two subscribing witnesses.

MONTAGUE MOORE.
THOMAS JAMES HESKETT.

Witnesses:
WALTER S. BAYSTON,
FRANK BAYSTON.